United States Patent [19]

Thompson et al.

[11] Patent Number: 5,726,976
[45] Date of Patent: Mar. 10, 1998

[54] CONGESTION SENSE CONTROLLED ACCESS FOR A STAR CONFIGURED NETWORK

[75] Inventors: Geoffrey O. Thompson, Palo Alto; Peter Tarrant, Los Altos; Som Sikdar, San Jose, all of Calif.

[73] Assignee: Bay Networks Group, Inc., Santa Clara, Calif.

[21] Appl. No.: 288,963

[22] Filed: Aug. 10, 1994

Related U.S. Application Data

[63] Continuation of Ser. No. 43,259, Apr. 6, 1993, abandoned.

[51] Int. Cl.[6] .................................................. H04L 12/413
[52] U.S. Cl. ............................ 370/229; 370/276; 370/445
[58] Field of Search ........................... 370/94.1, 60, 58.1, 370/58.2, 58.3, 110.1, 102, 85.1, 85.2, 85.3, 13, 16, 94.3, 24, 26, 31, 229, 235, 236, 240, 276, 279, 280, 293, 442, 282, 445, 230, 446, 231, 522; 371/39.1, 42

[56] References Cited

U.S. PATENT DOCUMENTS

| 4,630,288 | 12/1986 | Longstaff et al. | 370/261 |
|---|---|---|---|
| 4,759,018 | 7/1988 | Buchner | 370/535 |
| 4,920,533 | 4/1990 | Dufresne et al. | 370/445 |
| 5,012,467 | 4/1991 | Crane | 370/445 |
| 5,046,182 | 9/1991 | Hamstra et al. | 370/452 |
| 5,119,372 | 6/1992 | Verbeek | 370/230 |
| 5,121,382 | 6/1992 | Yang et al. | 370/250 |
| 5,249,183 | 9/1993 | Wong et al. | 370/228 |
| 5,293,377 | 3/1994 | Gould | 370/410 |
| 5,311,114 | 5/1994 | Sambamurthy | 370/296 |

OTHER PUBLICATIONS

Thomas W. Madron, "Lans Application Of IEEE/ANSI 802 Standards" 1989. pp. 15–45 and 60–63.
ANSI/IEEE Standard 802.3 1992. —Abstract & Table of Content—.
IEEE Standard 802.5, 1992—Table of Content & Abstract—.
Martin de Prycker, "Asynchronous Transfer Mode Solution For Broadband ISDN" 1992. —Tables of Contents.

*Primary Examiner*—Chau Nguyen
*Attorney, Agent, or Firm*—Blakely, Sokoloff, Taylor & Zafman

[57] ABSTRACT

A method and approach for providing improved performance in a CSMA/CD-type network utilizing transmission of block encoded congestion sense signaling to allow full duplex transmission of data over a communication link segment. In addition, the method and apparatus for providing in-band signaling of congestion conditions is described. The improved method and apparatus are implemented with minimal changes to existing standards and allow for compatibility, above the MAC sublayer, with existing installed hardware and software bases.

3 Claims, 13 Drawing Sheets

CSMA/CC

CONGESTION SENSE CONTROLLED ACCESS FOR A STAR CONFIGURED NETWORK

This is a continuation of application Ser. No. 08/043,259, filed Apr. 6, 1993, now abandoned.

BACKGROUND OF THE INVENTION

1. Field of the Invention

The present invention relates to the field of computer network systems and, more specifically, to carrier sense multiple access/collision detection (CSMA/CD) systems such as the well-known Ethernet-type networks.

2. Description of the Related Art

Computer Networks Generally

Computers have become commonplace in today's society and, with their increased numbers, there is ever increasing requirement to provide communication between them. This requirement is increasing not only due to the number of computers which are to be connected together (leading, for example, to significant issues in managing the networks and in providing physical communication media, i.e., cabling) but also to increases in the mount of information which is required to be communicated between the various nodes. As a result, a amber of computer networking technologies have been developed and, often, standards have developed around these technologies.

Examples of these technologies include token ring networks in which a plurality of computers (or other devices such as file servers, networked modems, and the like-all of which will be referred to herein as devices) are connected in—either a physical or logical ring and a token (a set of recognizable bits) is transmitted around the ring from device to device. When a device requires access to the ring to transmit information, it waits to receive the token and then holds the token while transmitting on the network. By holding onto the token, other devices are prevented from receiving the token while information is being transmitted and, in this way, collisions of transmitted data on the ring are prevented. Token ring systems am further described by Thomas W. Madron, *LANS Applications of IEEE/ANSI 802 Standards*, John Wiley & Sons, Inc., 1989 (hereinafter, Madron) and IEEE Standards 802.5, 1985 & 1990, provides standards for operation and implementation of token ring networks. At present, token ting systems generally provide for transmission rates on the ring of 4 to 16 Mbps (mega-bits per second).

An emerging technology, which provides for higher transmission rates, is FDDI (or Fiber Distributed Data Interface) which provides for transmission rates of 100 Mbps on a ring. FDDI is also a token ring system which manages contention through passing of a token around a physical or logical ring. FDDI systems are further described by Madron and ASC X3T9.5 provides standards for operation and implementation of FDDI networks. Operating at 100 Mbps obviously offers speed advantages over 802.5 token ring networks.

Each of the above-discussed networks are examples of what is termed "shared media" networks in which a number of devices act to share a common media for purposes of communication of information between the devices. Such networks generally provide for some type of contention management, such as the described token passing technique.

Another emerging technology in the computer networking area is asynchronous transfer mode (ATM) networks which provides for a number of distributed switches for switching of cells or packets of information between devices. In current technology, it is generally hoped that commercial implementations of these networks will operate at 155 Mbps and higher. ATM networks are an example of a non-shared media network and as such collision prevention and collision detection techniques are unnecessary. ATM systems are further described by, for example, de Prychef, M., *Asynchronous Transfer Mode solution for broadband ISDN*, published by Ellis Horwood Limited, West Sussex, England, 1991. The International Telegraph and Telephone Consultative Committee (CCITT) provides standards for operation and implementation of ATM networks.

CSMA/CD Networks

Finally, carrier sense multiple access (CSMA) networks are also well-known. CSMA networks are generally thought of as being another example of shared media networks. This will be discussed in greater detail below. The present invention is primarily concerned with CSMA networks.

A device communicating over this type of network senses or listens to the communication media to determine if there are any messages being transmitted on the media before accessing the media for transmission itself. If two devices transmit simultaneously (on shared media), there will be a collision on the communication media. Therefore, devices in CSMA networks need to be capable of detecting such collisions (i.e., collision detection or CD). Thus, the acronym CSMA/CD. IEEE standard 802.3 describes CSMA/CD protocols for local area networks. CSMA/CD networks are described in greater detail with reference to, for example, Madron.

One well-known example of a CSMA/CD network is the commercially popular Ethernet network. In this specification, the terms Ethernet, CSMA/CD and IEEE 802.3 (or simply 802.3) will be used interchangeably except where it is noted that specific reference is being made to a particular one of these networks.

Generally, today's CSMA/CD networks operate at data transmission speeds of 10 Mbps. However, there has been much discussion of increased speed CSMA/CD networks operating at, for example, 100 Mbps. While this is a highly desirable goal, there are many technological hurdles to be overcome in achieving this goal. One of the greatest challenges in achieving this goal is that, from a commercial viewpoint, it is highly desirable to retain compatibility and compliance with the existing standards, as well as existing hardware and software, to the largest extent possible.

History of CSMA/CD

Some historical information on CSMA/CD networks is appropriate to aid in an understanding of the present invention. In this regard, reference is made to FIGS. 1(a), 1(b) and 1(c).

FIG. 1(a) illustrates a known Ethernet network and, specifically, illustrates two network segments. Each network segment comprises a coaxial cable, e.g., cable 108; and a plurality of nodes or devices, e.g., 101a, 101b and 101e. Each node is coupled with the coaxial cable through a transceiver cable (such as transceiver cable 102) and a transceiver (such as transceiver 103). (It is noted that in more recent network configurations, the transceiver is built directly into the node, or least into a network interface card embodied within the node. This avoids the need for the transceiver cable and allows coupling directly with the coaxial cable.)

In addition, the network segments are illustrated as being coupled with a repeater module 109 which serves to allow communication between the various network segments. In particular, a multiport repeater 109 is illustrated which allows communication between multiple network segments (however, only two segments are fully illustrated). The repeater is coupled with each of the various coaxial cables of the segments through a transceiver and transceiver cable (or, more recently simply through a transceiver embodied in the repeater coupled directly with the coaxial cable.)

Importantly, as can be readily seen, all devices coupled with network share a common communication medium with other devices, i.e., the coaxial cable. A message originating from any one node is communicated to all of the other various devices coupled with the segment (i.e., with the coaxial cable) and, through use of the repeater, the message is also communicated to other devices coupled with other segments of the network. Thus, this network configuration provides for communication from one point to multiple other points over a shared media.

More recently networks have been developed which are implemented in a star configuration. This is illustrated with reference to FIG. 1(b) which illustrates a central hub 133 in which each of the various nodes 131a, 131b and 131c are coupled to the hub 133 through link segments 132a, 132b and 132c, respectively. Link segments 132a, 132b and 132c each have a transmit and a receive link as illustrated by the figure.

More detail of the coupling of a node to the central hub is illustrated with reference to FIG. 1(c). FIG. 1(c) illustrates an Ethernet controller network interface card 151 which is typically coupled with, for example, the motherboard of a node through interface 153. In addition, FIG. 1(c) illustrates the central hub 133 which includes a module 156 which allows for coupling with the controller card 151. It is noted that although the hub 133 is illustrated as being of a modular design, it is not necessary to adopt such a design. Each of the controller 151 and module 156 typically comprise a wiring jack, 156a and 156b, respectively. The jacks 156a and 156b allow coupling of wiring 154 between the controller 151 and module 156. Most recently, this wiring 154 has comprised relatively inexpensive unshielded twisted pair (UTP) wiring.

In any event, as is seen with reference to FIGS. 1(b) and 1(c), the hub configuration provides for point-to-point communication to the nodes. The communication medium 154 is not shared with other devices in the network, although signals on this medium are transmitted to other devices.

Manchester Encoding

As has been stated, it is desired to increase the speed of a CSMA/CD network from the current 10 Mbps to high speeds, such as 100 Mbps.

(It is noted that, in this specification, reference is made to transmission speeds of, for example, 10 Mbps and 100 Mbps. This refers to the transmission speed of bits of information over the communication medium as distinguished from (1) the effective transmission rate of application level data from an application program running on one node to an application program running on another node or from (2) from the baud rate, which is also referred to as the line transition rate, which may be significantly higher than the bit transmission rate. In the case of application level communication, various overhead and other factors, including for example transmission errors, cause lower effective bit transmission rates than the transmission rates actually achieved on the medium.

Conventional Ethernet system utilize Manchester encoding on the communication medium. Use of Manchester encoding effectively requires a baud rate of two times the desired bit transmission rate. Therefore, to achieve a bit transmission rate of 10 Mbps in a typical Ethernet system utilizing Manchester encoding, a baud rate of 20 MHz is required. Further information on Manchester encoding techniques is available with reference to Madron at pages 60–63.

Therefore, it is understood that, if it was desired to increase the speed of bit transmission in a CSMA/CD network by simply increasing the baud rate on the communication medium while continuing to utilize conventional Manchester encoding techniques, the baud rate of conventional Ethernet communication media must be increased from 20 MHz to 200 MHz in order to achieve the desired 100 Mbps transmission rate. Order of magnitude increases in the baud rate of conventional Ethernet communication media likely will lead to numerous issues including, for example, an increase of RF emissions with respect to regulatory limits.

Thus, it is desired to develop a new line signaling technique which allows for an increased data rate on the communication medium without requiring an correspondingly equal percentage increase in the line transition rate (i.e., baud rate).

Inactive Nodes

As has been discussed, Ethernet networks are designed around the concept that a node which wishes to transmit on the network first senses the shared communication medium to determine if it is idle. After having determined the medium is idle, the node transmits. If two nodes transmit simultaneously, collisions occur. As a result of this design, nodes which do not have messages to transmit ("inactive nodes") do not transmit on the medium (although they continue to monitor the medium for packets to be read.) As a result, and as will be discussed below, when a device starts to transmit, information packets must start with a relatively long preamble to allow the various other nodes on the network to acquire and generate receive clock signals which are in phase with the incoming packet. By synchronizing clocks, data may be properly decoded when received.

Packet Format

The 802.3 standard specifies a format of a frame or "packet structure" 201 for data packets which is more fully described with reference to FIG. 2. This packet structure 201 is also referred to as the MAC packet structure because it is defined by IEEE 802.3 as part of the Media Access Control (MAC) sublayer of the OSI reference model.

OSI reference model is a 7 layer conceptual model for networking systems which is well-documented in the art. The present invention is primarily concerned with the Physical and Data Link layers of the OSI model. The Data Link layer is often discussed as having two sublayers—the MAC or media access control sublayer and LLC or logical link control sublayer. Reference is made to Madron at pages 15–45 for further information on the OSI model)

Importantly, the MAC packet structure as defined by the 802.3 standards includes substantial overhead. For example, the packet structure 201 includes a 7 octet (56 bit) preamble which, as has been mentioned, is provided for clocking synchronization between a transmitting node and the receiving nodes. The packet structure 201 further includes a 1 octet (8 bit) start flame delimiter (SFD) which indicates the start of frame. The minimum packet size is 72 octets (the maximum is 1526 octets); therefore it can be seen that the preamble and SFD can constitute as much as over 11 percent of the total packet size (8 octets out of 72). The preamble and SFD information must be transmitted with every packet, thus requiring 8 octets (64) bits of overhead to be associated with each packet.

Thus, it is desired to develop a packet structure which reduces overall overhead, including for example, the overhead of the preamble and the SFD. In addition, it is desired that any such changes in packet structure require minimal changes to the MAC sublayer and not require changes to the higher level OSI layers, including allowing implementation without any changes to the frame structure utilized by these higher levels.

Half-Duplex Transmissions/Monitoring of Carrier Sense

The IEEE has recently developed standards for use of twisted pair cabling in 802.3 networks. The standards provide for coupling of two devices (e.g., two data terminals or a data terminal and a repeater) over a twisted pair link comprising two sets of twisted pair wires. The twisted pair cabling terminates at a medium attachment unit (MAU) on each of the two devices. For example, as mentioned above in connection with reference to FIG. 1(c), Ethernet controller 151 may be coupled with central hub 133 over unshielded twisted pair wiring 154.

(It is noted that, with reference to the OSI model, the Physical Layer is comprised of the Physical Media Access (PMA) and the Physical Layer Signaling (PLS) sublayer. The PMA is embedded in the MAU. The Physical Layer Signaling (PLS) sublayer provides for physical and logical coupling between the MAU and the Data Link Layer and, optionally, an Attachment Unit Interface (AUI) which provides for coupling between the MAU and the PLS.)

Further detail of this coupling is provided with reference to FIG. 1(d) which logically illustrates aspects of the medium attachment units, 181 and 182, of each of the two devices. The figure further illustrates coupling of the MAU with the AUI through differential pairs DO, DI, and CI.

Reference is first made to MAU 181, and specifically, to transmitting data onto the twisted pair link through MAU 181. The MAU 181 receives signals for transmission on DO 161 from the AUI and proceeds to transmits these signals onto the twisted pair medium over differential pair 171 and 172. A positive signal is transmitted with line 171 being positive relative to the signal on line 172. A loopback function is provided within the MAU whereby the signal on DO 161 is provided back on the input, DI 163, of the MAU under control of a controller 167. Controller 167 controls selection of signals for transmission on DI 163—Controller 167 selects either to loopback the signal on DO 161 when data is being transmitted on differential pair 171 and 172 or selects data from receive differential pair 173 and 174. For this purpose, data on receive differential pair 173 and 174 is monitored by controller 167. A collision is detected where there is a simultaneous occurrence of activity on DO 161 and of input data the receive differential pair 173 and 174.

When not transmitting data received on DO 161, MAU 181 controls output differential pair 171 and 172 to transmit an active idle signal. Likewise, when data is not being received on input differential pair 173 and 174, the circuit expects to receive an active idle signal on this differential pair to assure that the connection with MAU 182 has been maintained.

Thus, it can be seen that the design of twisted pair 802.3 networking systems (often termed 10BASE-T or 802.30) effectively allows for only half-duplex communication over the twisted pair link segment During periods of transmission by a MAU, the receive lines are monitored for the existence of a data signal. If a data signal is received during transmission it is interpreted as a collision on the liner.

Importantly, in addition to the constraints imposed by the 802.3 standard, commercial embodiments of the Ethernet controller cards and transceivers often share some internal hardware within the MAC, such as FIFO buffers and CRC generators/checkers, between the input and output paths. This, of course, further restricts these devices to half-duplex transmission.

Thus, it is desired to provide a communication system which allows for full-duplex transmission between devices in the network.

SUMMARY OF THE INVENTION

The present invention provides a method and apparatus providing for performance enhancements in CSMA/CD networks. It has been found that, through several changes to known CSMA/CD network communication techniques, it is possible to significantly increase the transmission speed on the network.

Initially, in the network of the present invention it is proposed to change the bit encoding technique on the transmission medium from the known Manchester coding technique to a so-called block or group coding technique. Although block coding techniques are known in the art, block coding is not understood to have been applied to standardized CSMA/CD networks. In the present invention, it has been discovered that use of block coding techniques in CSMA/CD networks allows use of a number of other inventive optimizing techniques. These techniques will be described in greater detail below.

The present invention is characterized by a first and second device coupled over a communication link, such as two pairs of twisted pair wires to allow communication of information and control signals between the first and second device. Each of the two devices include a transmit circuit and a receive circuit. Importantly, the present invention is further characterized by a control means for controlling transmission over the communication link. The control means is coupled to control transmission on the transmit circuit of the first device responsive to receiving control signals transmitted by the transmit circuit of the second device over the communication link. The second device may comprise a similar control circuit for controlling the transmit circuit of the second device responsive to signals received from the first device. The control signals are preferably transmitted as block encoded signals.

The present invention further provides a method for transmitting information in a network wherein a first device begins to transmit information on a first communication circuit, the first communication circuit providing for communication of information between the first device and a second device and the second device receives the transmitted information. At some point, the second device detects that a congestion condition occurs. For example, the second device may detect that its receive buffers are full or close to full. The second device transmits a control signal to the first device indicating that a congestion condition has occurred. Responsive to receiving the control signal, the first device at least temporarily halts transmission of information to the second device. When the congestion condition has cleared, the second device sends a second control signal indicating that the congestion condition has cleared and the first device again begins transmission of data. The control signal is preferably a block encoded signal.

Importantly, the present invention discloses transmission of the control signals in-band with other information, for example, in-band with transmission of packet data.

These and other aspects of the present invention will be described in greater detail with reference to the Detailed Description and the accompanying figures.

Figure 1A:
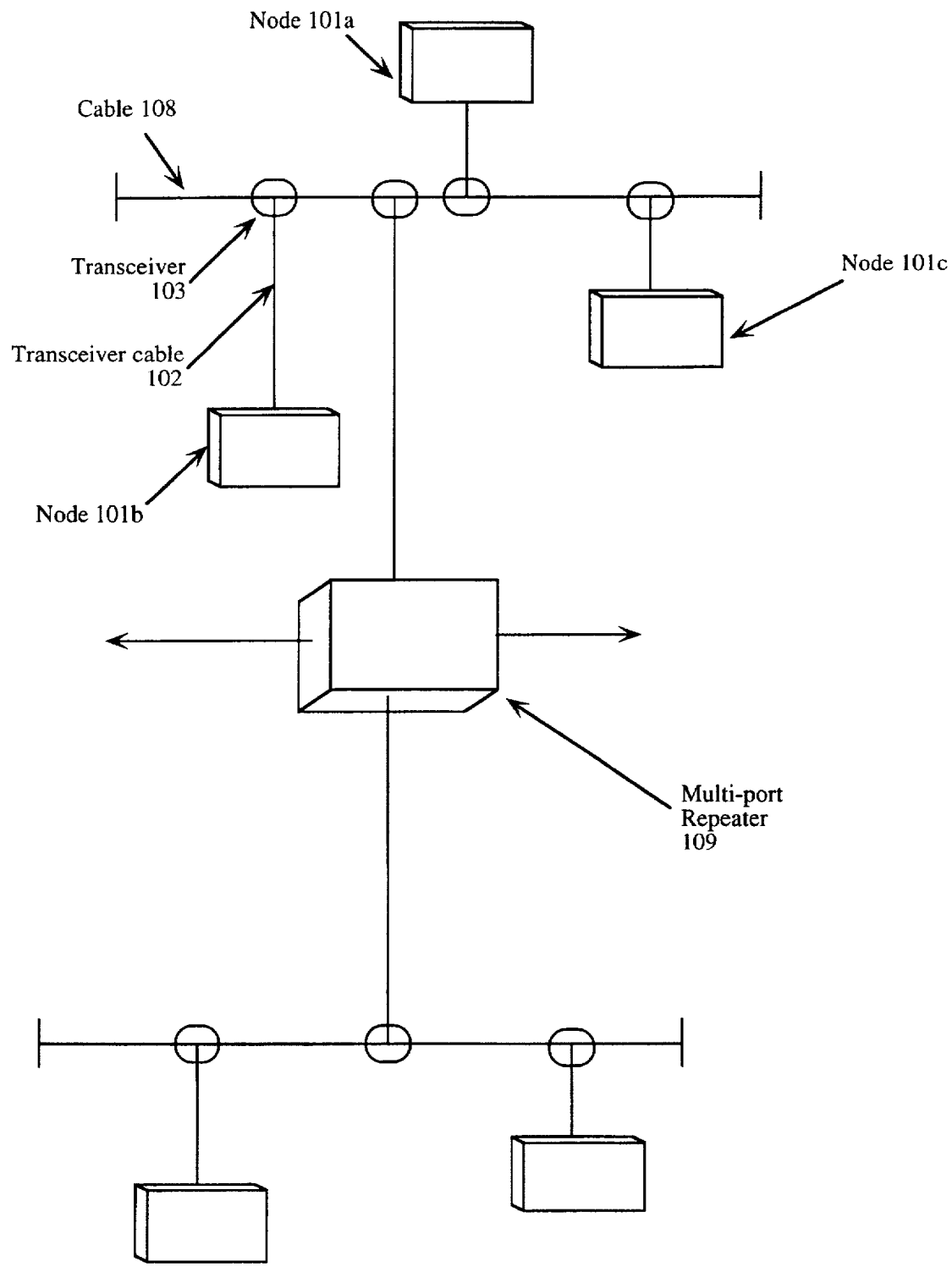
FIG. 1(a) illustrates a known CSMA/CD communication network including two network segments utilizing a coaxial cable.
Figure 1B:
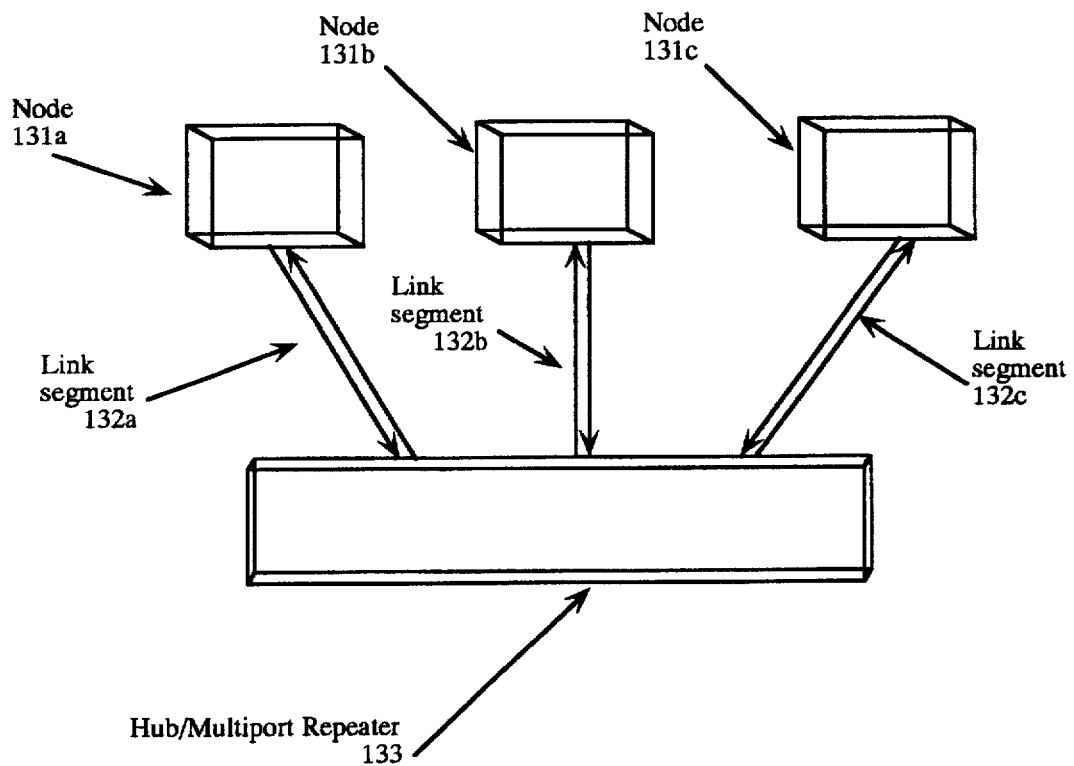
FIG. 1(b) illustrates a CSMA/CD communication network organized around a central hub utilizing link segments comprising unshielded twisted pair or fiber cabling.
Figure 1C:
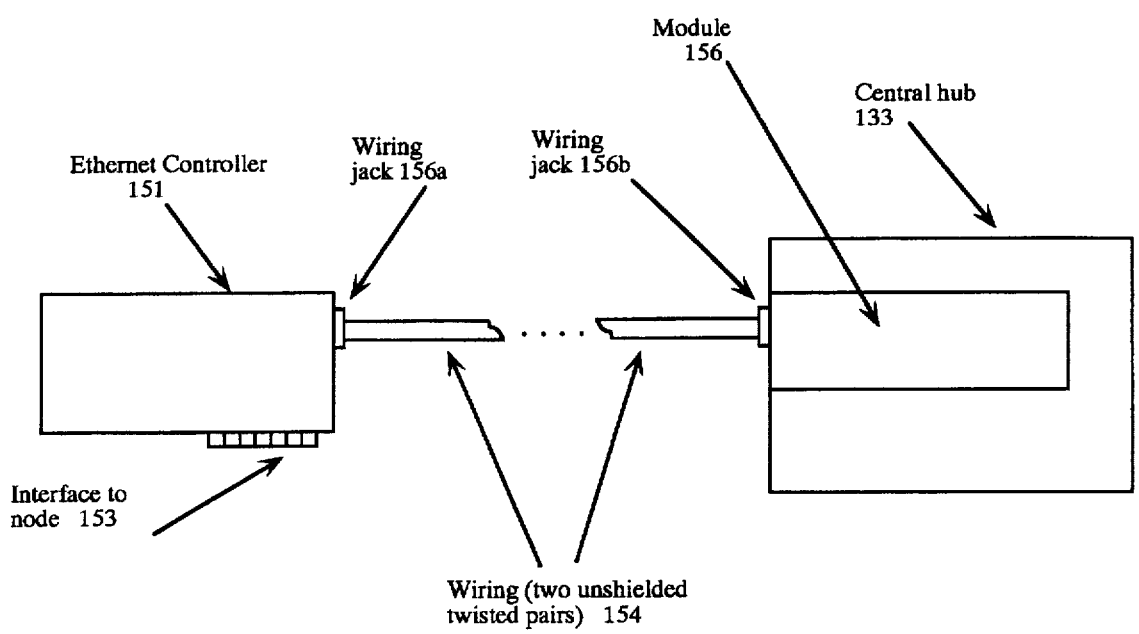
FIG. 1(c) illustrates an Ethernet controller card coupled with a central hub over a twisted pair wire connection.
Figure 1D:
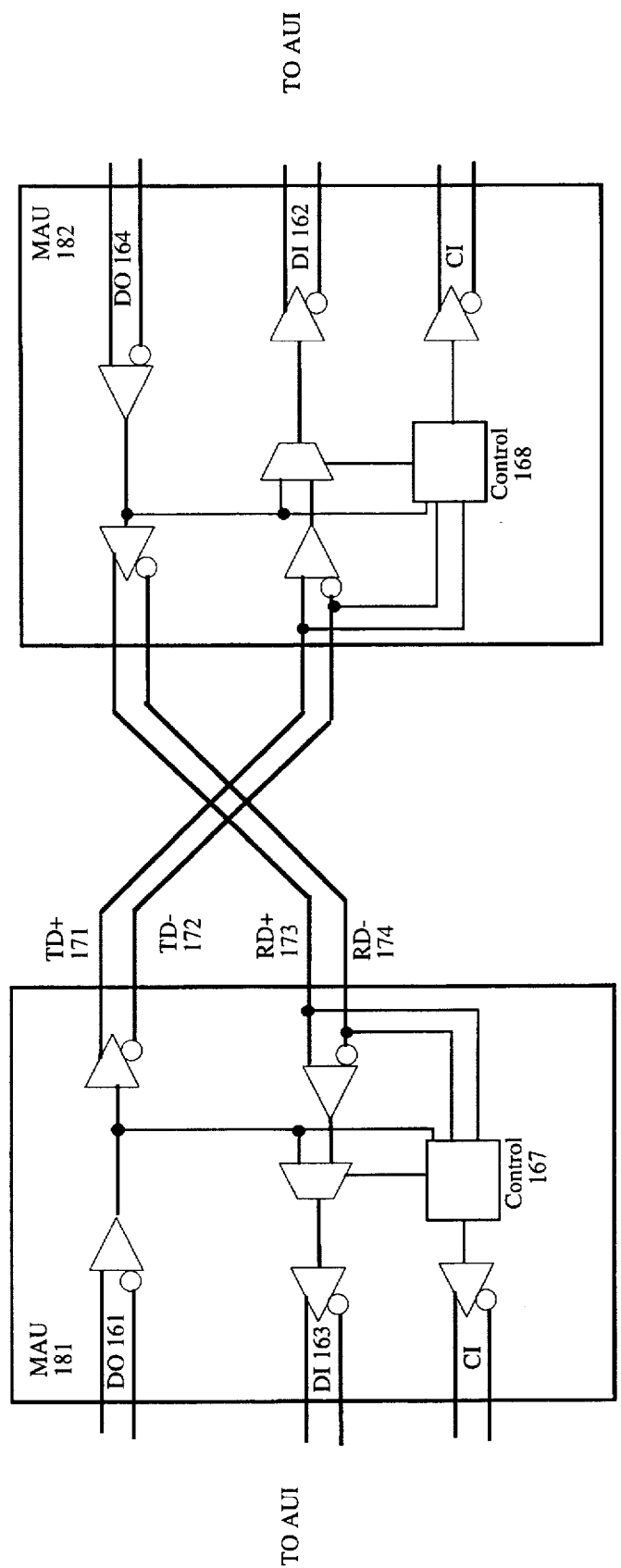
FIG. 1(d) illustrates further detail of the coupling of FIG. 1(c).
Figure 2:
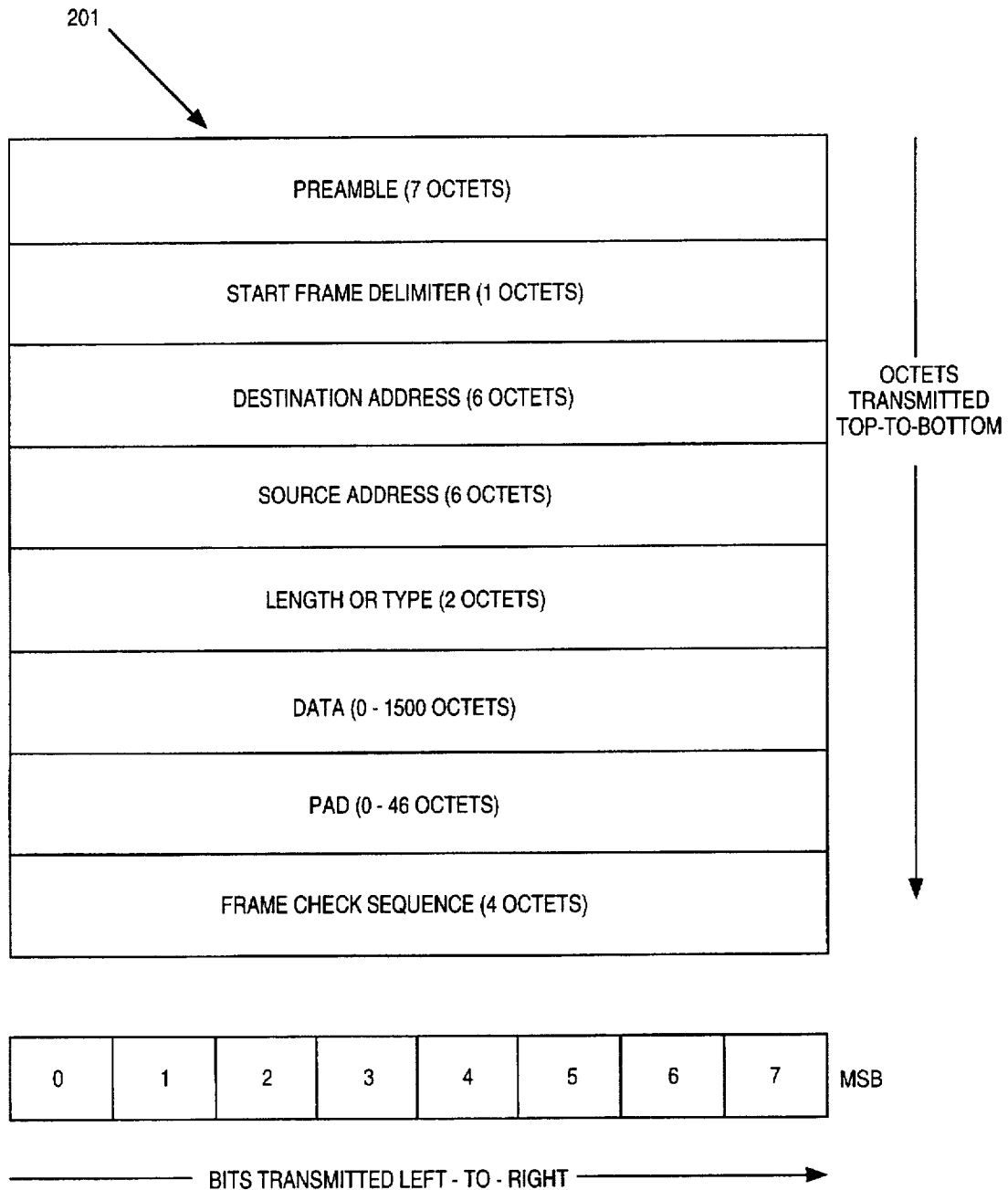
FIG. 2 illustrates a prior art packet and frame format.

For ease of reference, it might be pointed out that reference numerals in all of the accompanying drawings typically are in the form "drawing member" followed by two digits, xx; for example, reference numerals on FIG. 1 may be numbered 1xx; on FIG. 2, reference numerals may be numbered 2xx. In certain cases, a reference numeral may be introduced on one drawing and the same reference numeral may be utilized on other drawings to refer to the same item.

DETAILED DESCRIPTION OF THE PREFERRED EMBODIMENT

What is described herein is a method and apparatus for providing improved performance characteristics with minimal changes to a CSMA/CD network. In the following description, numerous specific details are set forth in order to provide a thorough understanding of the present invention. It will be obvious, however, to one skilled in the art that the present invention may be practiced without these specific details. In other instances, well-known circuits, structures and techniques have not been shown in detail in order not to unnecessarily obscure the present invention.

OVERVIEW

The present invention provides method and apparatus to increase the speed of data transmission networks which generally follow the 802.3 standards while requiring, in certain cases, no changes to existing standards and, in other cases, minimal changes to the standards. Importantly, to the extent changes to the standards are proposed, the proposed changes are only to the MAC sublayer and below (i.e., the Physical Layer) and are otherwise compatible with existing IEEE 802 standards. All of the proposed changes allow the frame format, as seen by the higher OSI layers, to be unchanged and for the functional requirements of the driver software to be unaltered. Thus, software compatibility is maintained while increasing transmission speeds on the network.

To begin, the present invention provides for changing from use of Manchester encoding to transmit data on the network to use of a so-called block or group coding technique. In itself, this change provides for increased transmission rates on the network because less of the link signal bandwidth is used for transmission of synchronizing information. However, the improvement proposed by the present invention goes well beyond taking advantage of this increased signaling efficiency and provides for other improvements which allow for increased transmission speeds.

First, as discussed in the Background Section, the original design of CMSA/CD system was oriented toward multiple devices communicating over a single medium. This required that inactive stations not emit signals and, rather, listen to the medium for the presence of signals to be read. When a device in a network of this configuration starts to transmit, the transmission starts with a relatively long preamble which allows the receiving devices to acquire and generate a matching clock signal. More recently, the 802.3 standards have provided for point-to-point communication system. In these systems, an active idle signal is transmitted by a device on the point-to-point link when the device is not transmitting data. The idle signal does not provide for synchronization of clocks between the two devices on the point-to-point network. Thus, when a device is ready to transmit data, it still must transmit the preamble information in order to allow for generation of a matching clock by the other device on the point to point link. The present invention provides for transmission of an idle signal block code on the point-to-point link when a device is not transmitting data. This idle signal allows for continuous synchronization of clocks between the two devices on the point-to-point link. In this way, the preamble can be eliminated from the packets transmitted on the network. This results in a significant reduction in transmitted overhead.

As has been just discussed, existing 802.3 standards provide for the transmission of a preamble at the beginning of each packet. In addition, these standards provide for transmission of an eight bit Start Frame Delimiter (SFD). The present invention proposes use of a single block code as a SFD. Assuming 4 of 5 block encoding, use of the continuous synchronization technique provided by the idle signal, along with use of the block code for the SFD, allows reduction of the packet size by 60 bits (from the 64 bits currently required by the 56-bit preamble and the 8-bit SFD to the 4 bits (5 baud) required for the SFD block code.)

In addition, in existing 802.3 networks when a device on the point-to-point link is transmitting data on its transmit link and simultaneously receives data (not the idle signal) on its receive link, the device recognizes the event as a collision. Thus, although the point-to-point link provides for simultaneous bi-directional communication between the two devices, effectively, this communication is limited to one-way communication of data. The present invention provides for effective two-way communication of data and, further, provides for detection of congestion conditions on either side of the communications link and for halting transmission of data from the other side of the link during periods of congestion. Importantly, the present invention provides for halting of transmission of data by allowing in-band transmission of congestion sense signals over the reverse communication link. In addition, the present invention provides for in-band signaling of other network management information over the communication link.

BLOCK CODED LINE SIGNALING

As one aspect of the present invention, communication between devices in the network is accomplished by use of block encoding of the data to be transmitted on the communication link. As has been mentioned, this differs from existing 802.3 networks which utilize Manchester encoding techniques. The present invention proposes use of either a 4B/5B encoding technique, a 8B/10B encoding technique or other binary or multi-level block encoding technique.

Essentially, block encoding techniques call for encoding n bits of data into m baud (or line state transitions) and transmitting the encoded information over a communication medium. Generally, in block encoding techniques, m is greater than n. The encoded information is received by a receiving device and is decoded into the original n bits of information. For example, in 4B/5B encoding, 4 bits of data are encoded as 5 baud for transmission over the communication medium. Block encoding techniques, while not utilized in carrier sense networks, are well-known. Therefore, further description is not felt to be necessary.

Importantly, all of the encoded combinations of the n bits utilize less than all of the available combinations elm baud. For example, in 4B/5B encoding there are 16 combinations ($2^4$) of the 4 data bits and 32 combinations ($2^5$) of the 5 encoded baud. Thus, 16 combinations go unused for purposes of transmitting data. For certain well-known masons, it is undesirable to use certain of the encoded combinations. However, other combinations, unused by encoding data, are available and utilized by the present invention to provide for in-band signaling of certain conditions. This important aspect of the present invention will be discussed in greater detail below.

In either 4B/5B or 8B/10B encoding, 20% of the communication bandwidth is devoted to overhead associated with the encoding technique. This compares favorably with the 50% bandwidth overhead utilized in Manchester encoding systems.

In order to provide for appropriate clock synchronization with the receive clock, the present invention further proposes use of NRZI encoding (non-return to zero, invert on ones). NRZI encoding of information is well-known (although not in standard CSMA/CD networks) and, therefore, further description will not be provided here. The block codes are selected to provide for adequate transitions to allow for synchronization of the receive clock. For example, in a 4B/5B block code, combinations of the 5 bits which have at least two 1's (and, therefore, two transitions) may be selected for use. The frequent transitions in the block codes prevent long periods of the signal on the link being held in one state—these frequent transitions prevent loss of synchronization between the send and receive clocks.

INCREASED CLOCK SPEED ON THE LINK

As a second way of increasing transmission speeds on the network, it is proposed to increase the frequency on the communication medium from the present 20 MHz to, for example, 125 MHz. Earlier implementations of 802.3 networks have not utilized such high frequencies; however, newly available unshielded twisted pair wiring known as Category 4 and Category 5, along with higher performance bridging devices (also known as buffered repeaters) make increasing the frequency and data rate on the communication medium practical. Although this is a seemingly simple solution, increased clock speeds are achieved while providing for compatibility with existing 802.3 networks.

CONCEPTUAL REPRESENTATION OF THE CONTINUOUS SIGNAL SYSTEM ON THE LINK

Figure 3A:
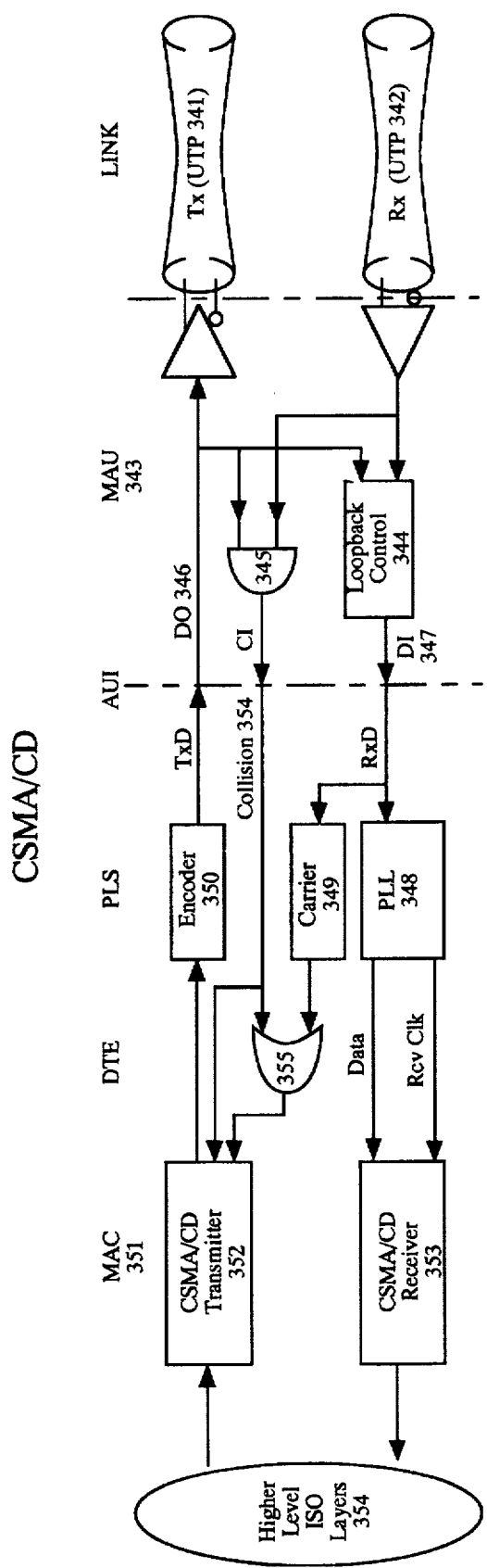
FIG. 3(a) illustrates a prior art CSMA/CD interface as may be implemented by the present invention.
Figure 3B:
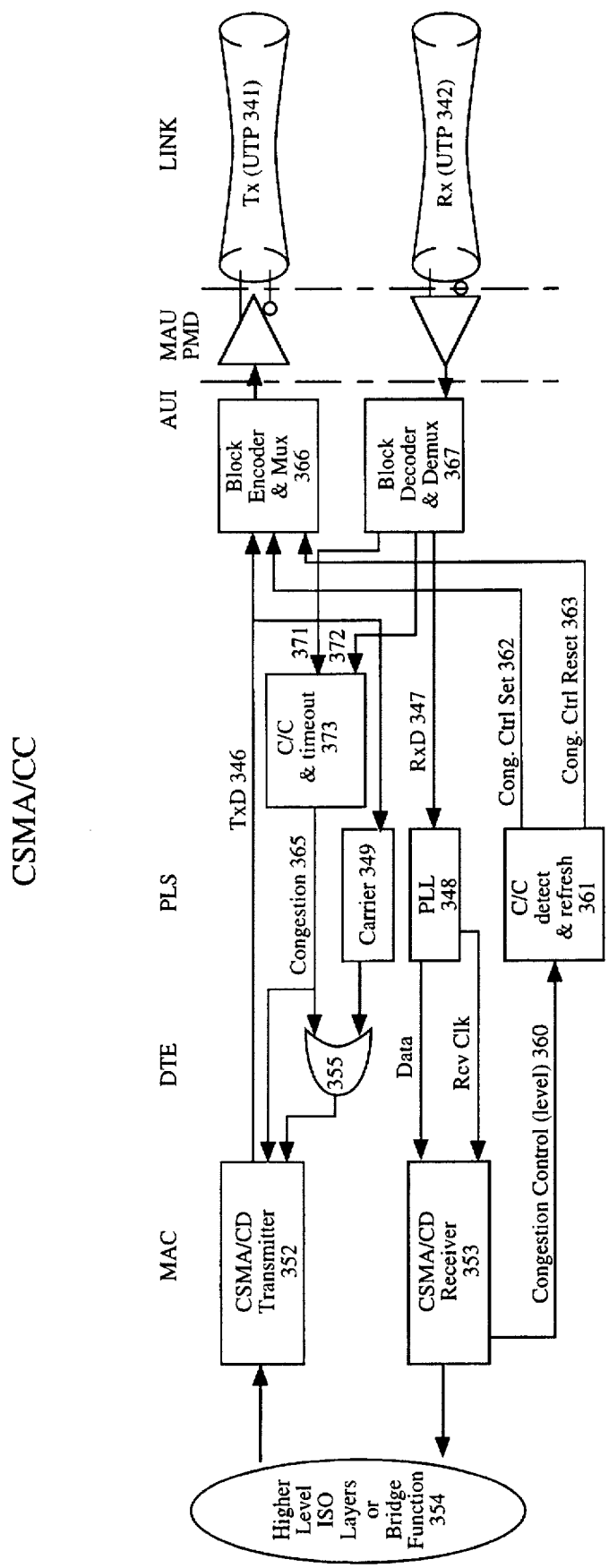
FIG. 3(b) illustrates a congestion sense interface as may be implemented by the present invention.
Figure 3C:
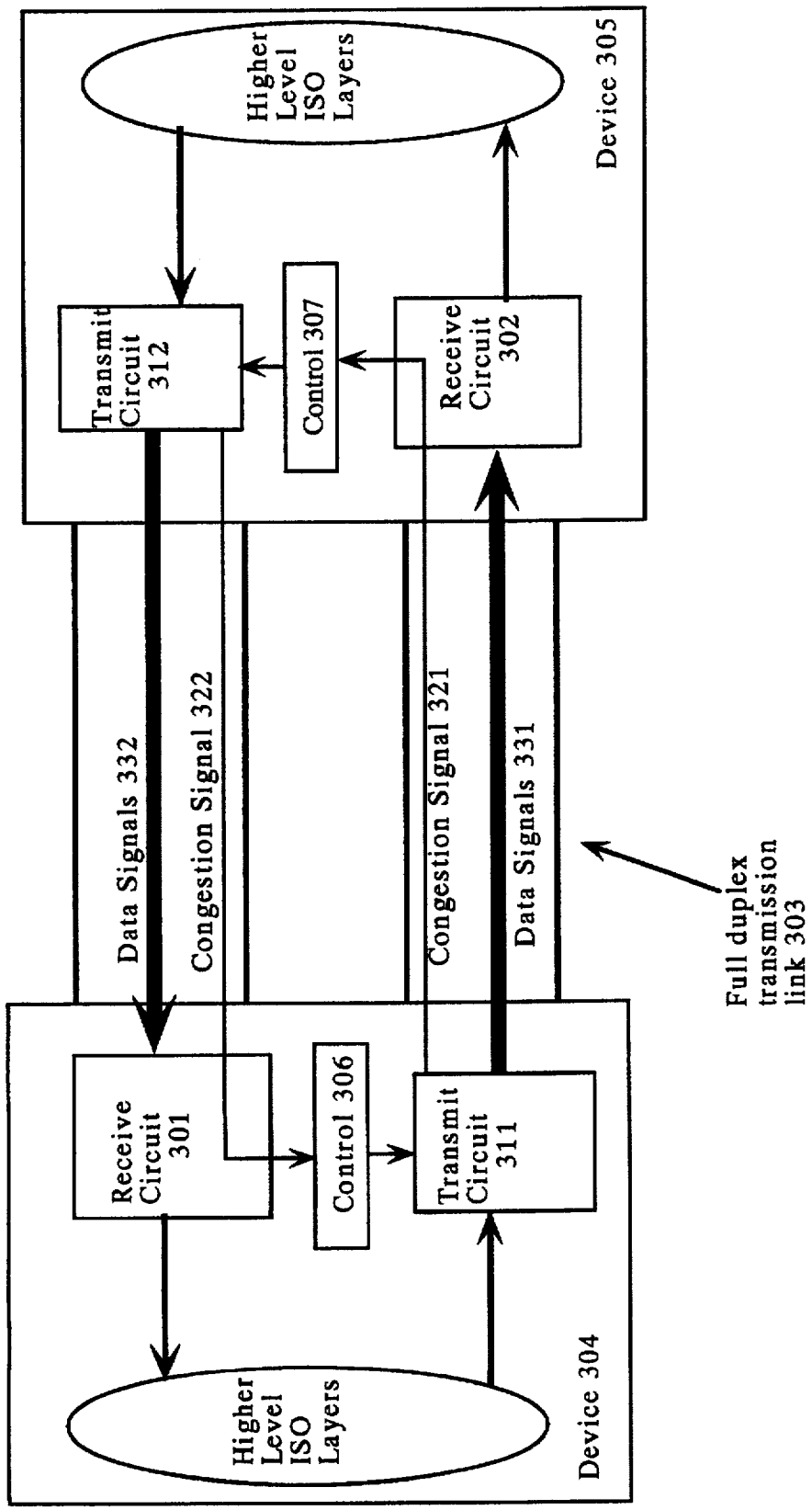
FIG. 3(c) illustrates a congestion sense network, including block diagram illustration of interfaces at two sides of a transmission link, as may be implemented by the present invention.

It is now worthwhile to turn to FIG. 3(c) which illustrates, conceptually, two devices, 304 and 305, coupled over a point-to-point communications link. The devices 304 and 305 may comprise, for example, computer workstations, printers, file servers, repeaters or other devices. The details of the interface of the two devices 304 and 305 are shown in greater detail with reference to FIG. 3(b) which illustrates a network interface as may be utilized by the present invention.

Each of the devices, 304 and 305, comprise a receive circuit 301 and 302, respectively, and a transmit circuit, 311 and 312, respectively. The receive circuits 301 and 302 and the transmit circuits 311 and 312 are coupled with a full-duplex communications link 303. In the preferred system, this link 303 may comprise two pairs of unshielded twisted pair wiring coupled as in a cross-connected configuration as was described with reference to FIG. 1(d). However, other types of physical communications medium may also be utilized-for example shielded twisted pair wiring, and fiber optics cabling. In any event, as can be seen with reference to FIG. 3(c), the transmit circuit 312 of device 305 is coupled to communicate information to the receive circuit 301 of device 304 and the transmit circuit of device 304 is coupled to communicate information to the receive circuit 302 of device 305. Each of the transmit circuits 311 and 312 and receive circuits 301 and 302 are coupled to interface with higher ISO levels executing on their respective devices 304 and 305.

Importantly, the present invention provides for continuous transmission of an idle signal over the communication link 303 by the devices 304 and 305 during periods when it is not necessary to communicate data or other control information. For example, during periods when device 304 is not communicating data or control information over the link 303 to device 305 (i.e., from transmit circuit 311 to receive circuit 302), device 304 causes an idle signal to be transmitted over this half of the link 303. Similarly, device 305 communicates idle signals from transmit circuit 312 to receive circuit 301 during periods when device 305 does not have other information to transmit.

Figure 5:
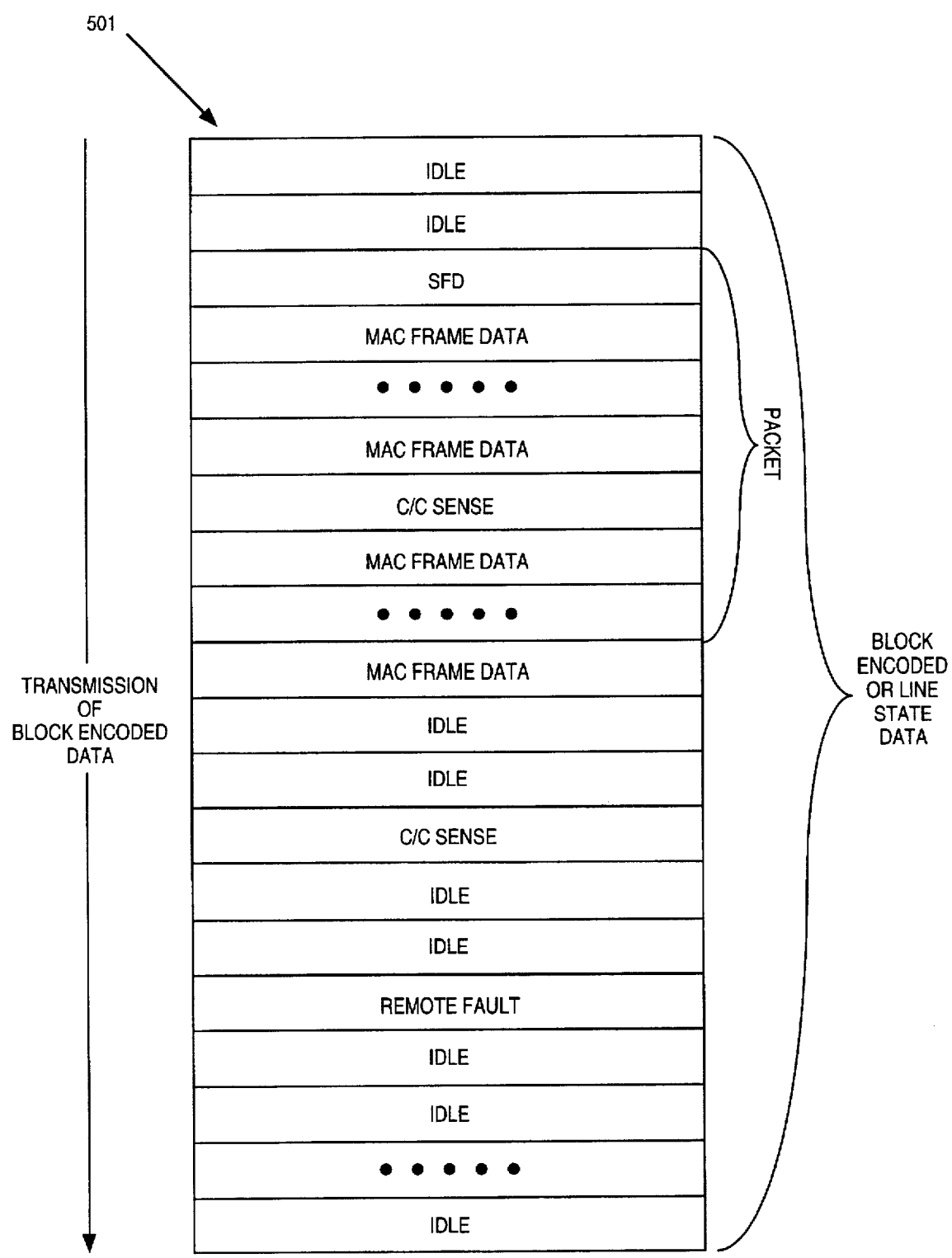
FIG. 5 illustrates a stream of encoded data or line states as may be transmitted over a communication by a device of the present invention.

This is better understood with reference to FIG. 5 which illustrates a stream of block encoded data 501 which may be communicated over the link 303, for example from device 304 to device 305. As has been discussed, this stream of data 501 is preferably transmitted as block encoded data. The idle signals are, thus, transmitted, as block encoded signals.

The stream of data 501 is illustrated as starting with two block encoded idle signals followed by a block encoded start of frame delimiter (SFD) and other packet data and control information. The SFD, packet data and control information will be discussed in greater detail below. Following transmission of the end of the packet, block encoded idle signals are again transmitted until it is necessary to transmit additional block encoded control signals. This process of transmitting block encoded idle signals during periods when it is not necessary to transmit data and control signals continues as long as the link 303 is active.

By continuously transmitting the above-described block encoded signals, including idle signals, during periods when it is not necessary to transmit data and control signals, the devices 304 and 305 are able to continuously monitor the presence of block encoded data on the link 303 and, therefore, to maintain clock synchronization.

Figure 4:
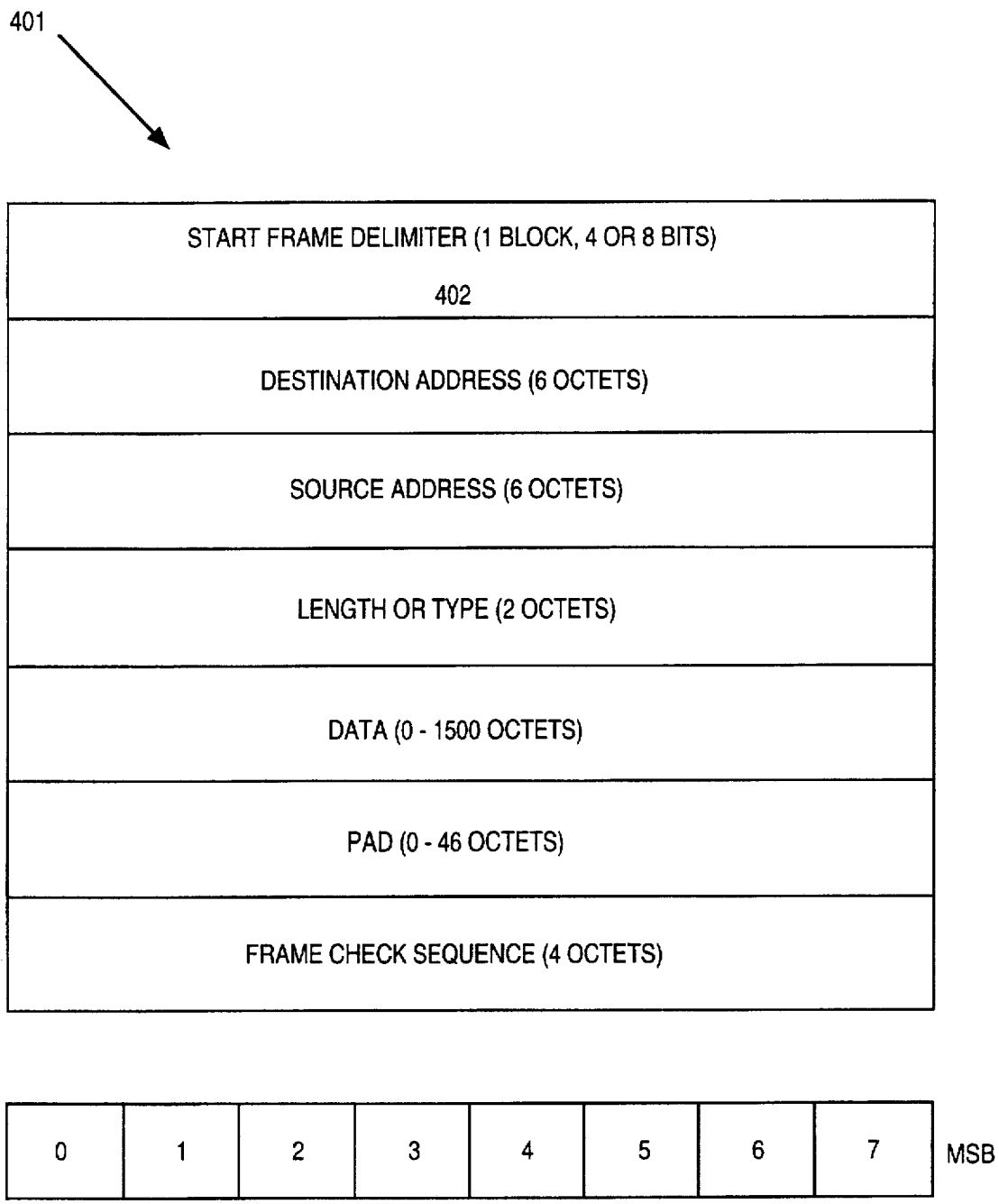
FIG. 4 illustrates a packet and frame format as may be utilized by the present invention.

Important to the present invention, because clock synchronization is continuously maintained as a result of continuous transmission of block encoded data on the link 303, it is not necessary to transmit a long preamble prior to transmission of a packet as has been required in prior art 802.3 implementations. Thus, the present invention proposes a change to the packet structure (but which will not effect higher ISO level frame structures). This change is understood with reference to FIGS. 2 and 4. As has been discussed, FIG. 2 illustrates a prior art 802.3 packet structure 201. This prior art packet structure 201 includes a 7 octet preamble. The present invention, as a result of continuous synchronization of the receive clocks with the transmit clocks, allows for elimination of the 7 octet preamble. This is illustrated by FIG. 4 which illustrates the proposed packet structure 401 which frame structure 401 does not comprise a preamble. The remaining data in the frame structure is preferably transmitted over the link 303 as block encoded data. As can be seen, the proposed packet structure starts with a SFD 402. The SFD 402 will be discussed in greater detail below.

DETAILED DESCRIPTION OF THE NETWORK INTERFACE (Prior Art CSMA/CD System)

FIG. 3(a) illustrates a network interface for a prior art CSMA/CD system. It is useful to provide a brief overview of such a prior an interface in order to assist in developing an appreciation of the similarities, and differences, between such a prior an interface and the interface proposed by the preferred embodiment of the present invention.

The prior an device communicates over a link such as the illustrated unshielded twisted pair (UTP) link. This UTP link comprises two unshielded twisted pairs of wires, 341 and 342. These UTPs 341 and 342 couple with MAU 343 of the prior an device and, in particular, the first UTP pair 341 couples with Data Out circuit 346 and the second pair 342 is coupled in communication with Data In circuit 347. Pair 342 is coupled in communication with the Dam In circuit 347 through loopback control circuit 344. In addition, Data Out circuit 346 is provided as a second input to loopback control circuit 344.

Data In circuit 349 is also provided to carrier souse circuit 349. Carrier sense circuit 349 provides as an output a signal indicating whether a carrier signal is present on circuit 347. This output is coupled as an input to OR gate 355.

Data out circuit 346 and Data In circuit 347 are both provided as inputs to AND gate 345. If transmission is detected on both circuit 346 and 347, a collision condition is signaled on collision detection line 354. Collision detection line 354, as well as the output of carrier sense circuit 349, are provided as inputs to OR gate 355. The output of OR gate 355 is provided as a control input to CSMA/CD transmitter 352 of the MAC introduce 351. The output of AND gate 345 is also provided as a control input to transmitter 352.

The Data In circuit 347 is further provided as an input to phase locked loop circuit 353 which provides, as its outputs, both a data signal and a receive clock signal to CSMA/CD receiver 353. CSMA/CD receiver 353 interfaces as input to higher lever ISO layers 354.

The higher level ISO layers 354 also interface by providing information to CSMA/CD transmitter 352. Assuming carrier is sensed on the receive line (through carrier sense circuit 349) and no collision is sensed, CSMA/CD transmitter is controlled to provide output data to encoder 350 which is then provided on Data Out circuit 346.

All of the above is well-known in the art and is provided here simply as background. Further description is available from any of a number of sources. Importantly, it can be seen and appreciated that CSMA/CD transmitter may be controlled to transmit only when carrier is sensed and collisions are not detected. Therefore, by definition, the interface may only transmit or receive at any given time and the interface does not, therefore, provide a full-duplex interface.

DETAILED DESCRIPTION OF THE NETWORK INTERFACE (Present Invention)

FIG. 3(b) illustrates in greater detail the network interface of a device of the present invention. As can be seen, similar to the prior art interface described above, the interface of the present invention is designed to interface with a communications link such as the illustrated unshielded twisted pair interface which comprises the two unshielded twisted pairs (UTP) of wires 341 and 342. However, as has been mentioned, the present invention provides for full duplex communication over the link. Further, as has been mentioned the present invention takes advantage of block encoding techniques for transmission of data on the link. Therefore, the present invention provides for block encoder and multiplexer circuit 366 which is coupled with the transmit circuit 346. Thus, data may be provided to the block encoder 366 by CSMA/CD transmitter 352 and may be block encoded. In addition, CSMA/CD receiver 353 provides a congestion control level signal on line 360 to congestion control detect and reset circuit 361. The circuit 361 provides both congestion control set signal on line 362 and a congestion control reset signal on line 363. These signals, on lines 362 and 363 are provided as inputs to block encoder and multiplexer circuit 366. Circuit 366 is responsible for block encoding these signals for transmission on twisted pair 341 and for multiplexing these transmissions with transmissions of data received on circuit 346.

Data received on twisted pair 342 is provided to block decoder and demultiplexer circuit 367. Circuit 367 provides for demultiplexed and decoding the block encoded data. Congestion sense set signals are provided on line 371 and collision sense reset signals are provided on line 372 to congestion sense control and timeout circuit 373. As will be described, circuits 361 and 373 provide for periodic refreshes of the congestion sense condition.

The output of circuit 373 is a signal on line 365 representing whether there is a congestion condition at the transmitter on the other side of the link. This signal is utilized in place of the collision signal on line 354 of the prior art circuit as an input to OR gate 355. Further, OR gate 355 no longer receives its input from receive circuit 347 indicating the existence of a carrier signal on the input half of the link and instead receives, through carrier circuit 349, an indication of whether its own transmitter 352 is currently transmitting. In this way, change is not required to transmitter 352 and transmitter 352 may be controlled to allow transmission of data as long as a congestion condition is not indicated by the device on the other side of the link. The only change required to receiver 360 is to allow it provide a congestion control signal indicating the congestion level of the receive side of the link. Thus, only minimal changes are required to be made to the MAC layer interface. No changes are required to be made to the higher level ISO layers while gaining the advantages of the present invention.

START FRAME DELIMITER (SFD) SYMBOL CODE

It has been discussed above that use of block encoding in transmission of data over link 303 allows for transmission of the data in encoded form and also leaves as available a number of additional codes which may be utilized by the communication system. The present invention proposes using one of the remaining codes for use as a start of frame delimiter (SFD). As was illustrated by FIG. 2, the prior art packet structure 201 requires use of a SFD. However, this prior art frame structure requires 1 octet (8 bits) of data to be transmitted for the SFD.

Assuming a 4B/5B encoding implementation, the present invention requires only 4 bits (5 baud) for transmission of the block encoded SFD 402. Thus, the proposed packet structure 501 provides for a reduction of the packet structure size, over the prior art packet structure 201, by 60 bits (from the 64 bits currently required by the 56-bit preamble and the 8-bit SFD to the 4 bits (5 baud) required for the SFD block code.)

It might be noted that for improved imunity to line errors in the transmission media, it may be desirable to use a combination of the block codes for the SFD. This, of course, may be done without departure from the basic concepts of the disclosed congestion control mechanism.

CARRIER/CONGESTION SENSE ON/OFF IN-BAND SIGNALING

In addition to the above-discussed special block codes for idle and SFD, the present invention proposes allocation of five additional special block codes:

(1) Carrier/Congestion Sense On
(2) Carrier/Congestion Sense Off
(3) Remote Fault1
(4) Remote Fault2
(5) Remote Fault3

The Remote Fault signals are provided to allow in-band transmission of network management information. For example, the remote fault signals can be used to signal fault conditions in the MAU and link/UTP portions of the system such as: (1) loss of receive signal; (2) loss of synch; or (3) jabber protection circuit activation. These signals may be used, for example, by network management facilities, used to control indicators (e.g., LEDs) or used to force use of a standby facility.

As will be discussed in greater detail below, the Carrier/ Congestion (C/C) Sense On/Off signals provide set and reset signals to a control circuit (preferably the control circuit comprises a bistable circuit such as a flip-flop) on the receive side of the link. This will be discussed in greater detail below.

These control and management signals (sometimes referred to collectively as control signals) are provided in-band with other signals transmitted on the link 303. In the preferred system, as has been discussed, signals transmitted on link 303 are transmitted in block encoded form. As was discussed above in connection with transmission of idle signals to provide for continuous clock synchronization, FIG. 5 illustrates a stream of the block encoded data 501. In the stream 501 of FIG. 5, the first two blocks of data are idle signals, followed by a SFD signal and a portion of a packet. The packet follows the format discussed in connection with FIG. 4. However, as illustrated by stream 501, during transmission of the packet, it may be desirable to communicate control information across the link 303.

Therefore, the present invention importantly provides for transmitting control information in-band with the packet. Thus, as illustrated, a C/C sense signal may be transmitted in-band with transmission of the packet. Following transmission of the C/C sense signal, transmission of the packet continues until its transmission is complete and the circuit again transmits idle signals. As illustrated, control signals may also be transmitted during idle periods on the link (i.e., during periods when idle signals are otherwise being transmitted.)

Of course, management signals, such as the above-discussed remote sense signals and other control signals may be transmitted in-band with the packet, in addition to the illustrated in-band transmission of the C/C sense signal

FULL DUPLEX TRANSMISSION

As has been briefly mentioned, the present invention provides for full-duplex transmission of data on the link 303. This important aspect of the present invention will now be discussed in greater detail.

FIG. 3(c) is a logical block diagram of the device of the present invention and has already been discussed in some detail However, for sake of completeness, some of that discussion will be repeated here. FIG. 3(c) illustrates two devices, device 304 and device 305. Each of these devices may be, for example, a work station, printer or other shared device, file server, network concentrator or network repeater. For example, device 304 may be one of the nodes 131a–131c illustrated by FIG. 1(b), while device 305 may represent one connection of the central hub 133.

The two devices 304 and 305 are coupled by a full duplex transmission link segment 303 which may correspond to one of link segments 132a–132c. The link segment 303 may comprise, for example, two pairs of unshielded twisted pair wires. The link segment 303 is logically illustrated as providing for transmission of data signals 331 from device 304 through transmit circuit 311 to device 305 through receive circuit 302 and for providing transmission of data signals 332 from device 305 through transmit circuit 312 to device 304 through receive circuit 301.

Apparatus for Receiving C/C Sense Signals

In addition, FIG. 3(c) illustrates logical transmission of congestion signals 321, in-band with the data signals 331 from transmit circuit 311 to device 305 and transmission of congestion signals 322, in-band with data signals 332, from transmit circuit 312 to device 304.

The congestion signals 321 and 322 are directed to respective control circuits 306 and 307. The remaining description of FIG. 3(c) provided here will be with respect to device 304 with the understanding that device 305 operates in a similar fashion. Control 306 is implemented to effectively provide a bistable (flip-flop) circuit responsive to the congestion signal 322 input. The congestion signal may be either a block encoded carrier/congestion (C/C) sense ON or carrier/congestion sense OFF signal The C/C sense ON signal operates to set the flip-flop and the C/C sense OFF signal operates to reset the flip-flop.

The output of control circuit 306 (i.e., the output of the flip-flop) is coupled to transmit circuit 311. Thus, when device 305 has most recently transmitted a C/C sense ON signal to control 306, the output of the control circuit 306 is set and this set (e.g., high) output is provided to transmit circuit 311. Similarly, when device 305 has most recently transmitted a C/C sense OFF signal to control 306, the output of control circuit 306 is reset and the reset (e.g., low) output is provided to transmit circuit 311.

Transmit circuit 311 is controlled by the output of control circuit 306 to defer transmission of data signals 331 to device 305 when the input from control circuit 306 is set (i.e., the most recent C/C sense signal was a C/C sense ON signal) and to allow transmission of data signals 311 to device 305 when the input from control circuit 306 is reset (i.e., the most recent C/C sense signal was a C/C sense OFF signal) via the use of CSMA/CD transmitter control mechanisms with the C/C signal used in place of the conventional carrier sense and collision detect signals. Thus, device 305 has the ability to control transmission of data signals to it by device 304 by providing appropriate C/C sense ON/OFF signals to device 304. These signals may be provided in-band with other data signals as has been discussed.

During periods when transmission of data signals has been deferred by receipt of a C/C sense ON signal, device 304 transmits idle signals over link 303 in order to provide for continuous synchronization of the receive clock of device 305.

Of course, one of ordinary skill in the art will realize that control circuit 306 could be designed to provide set signals responsive to receipt of C/C sense OFF signals (as opposed to the above-described reset signals) and reset signals responsive to receipt of C/C sense ON signals (as opposed to the above-described set signals) with corresponding changes to the logic of the transmit circuit.

Further, circuits other than a flip-flop may be utilized to implement the control of control circuit 306. What is important is that C/C sense signals, received in-band with other data signals, are provided to control transmission (either to halt or allow such transmission) by transmit circuit 311.

Control circuit 306 may be designed to provide for periodic refreshes of its output. For example, circuit 306 may reset the flip-flop periodically to ensure that continued transmission of data is allowed from device 304 to device 305 and that a C/C sense OFF signal was not inadvertently lost during transmission. This may be accomplished, for example, by providing a timer input to control circuit 306. In the event the tip-flop is refreshed and, thereby, device 304 again starts transmitting data to device 305, device 305 may detect the data transmission and transmit another C/C sense ON signal if it is not yet ready to receive data.

Apparatus for Transmission of C/C Sense Signals

The above-discussion has concentrated on reception of the C/C sense signals. It is now useful to discuss detection of congestion conditions in a device of the present invention and subsequent transmission of the C/C sense signals. This discussion will be made with reference to device 305; however, it will be understood that device 304 operates in a similar fashion.

As has been discussed, device 305 receives data on full duplex link 331 through receive circuit 302. Importantly, this data is transmitted from device 304 and device 304 is generally unaware of various problems that may be encountered by device 305. Absent some feedback from device 305, device 304 will continue transmit data onto link 303 as long as it has data to transmit. This is unlike prior art CSMA/CD system whose transmissions are not suspended due to receiver congestion. The present invention provides the feedback from device 305 to device 304.

Device 305 may detect some congestion condition resulting from receiving data on receive circuit 302. For example, a congestion condition may be determined to exist where device 305 comprises data buffers for buffering data as it is received and those buffers are at least temporarily filled. The data may be, for example, buffered prior to retransmission on a hub backplane, assuming device 305 to be a hub concentrator, or the data may be buffered prior to transmission out of lower speed ports, assuming device 305 to be a bridge. When the device 305 detects such a congestion condition, receive circuit 302 is coupled to communicate the existence of the congestion condition to transmit circuit and, respensive to detection of the congestion condition, transmit circuit 312 transmits a C/C sense ON signal on the link 303.

As has been discussed, the C/C sense ON signal may be transmitted in-band with data, such as a packet.

Similarly, at some point, the congestion condition will be relieved. For example, the data buffers which had previously been detected as filled, may have been, at least partially, cleared such as through transmission of the buffered data onto the hub's backplane bus. When device 305 detects that the congestion condition has been relieved, receive circuit 302 will communicate this to transmit circuit 312. Transmit circuit 312 will, in turn, transmit a C/C sense OFF signal on link 303. Again, the C/C sense OFF signal may be transmitted in-band with other data transmissions.

It was discussed above that the control circuit 306 may provide for a periodic refresh. As was discussed, upon refresh, data is again transmitted across the link 303. Therefore, in an embodiment of the present invention employing such a periodic refresh, if receive circuit 302 receives data (as opposed to idle signals and/or control and management signals) over link 303 during periods when it has sensed a congestion condition, receive circuit 302 will communicate with transmit circuit in order to cause transmit circuit to again transmit a C/C sense ON signal across link 303.

Use of a Switching-Style Hub

The present invention proposes use of the disclosed full duplex transmission technique with congestion sensing in a switching-hub. When using a switching style hub, hub collisions are not an issue, but rather, congestion at the hub presents a significant issue. Use of the disclosed congestion sensing method and apparatus acts to alleviate this problem and to allow for increased performance in such switching style hub networks.

Standards/OSI Changes

It is important to note that the congestion sense technique of the present invention may be implemented by changes to the OSI MAC sublayer and does not require changes to hardware and/or software implementing higher OSI levels. Thus, the present invention may implemented with minimal changes to existing hardware and software while providing for significant performance enhancements. Thus, the higher level hardware and software may be used in systems operating at the higher speeds offered by the present invention or in system implementing conventional technology.

Method of Providing for Congestion Detection

Figure 6:
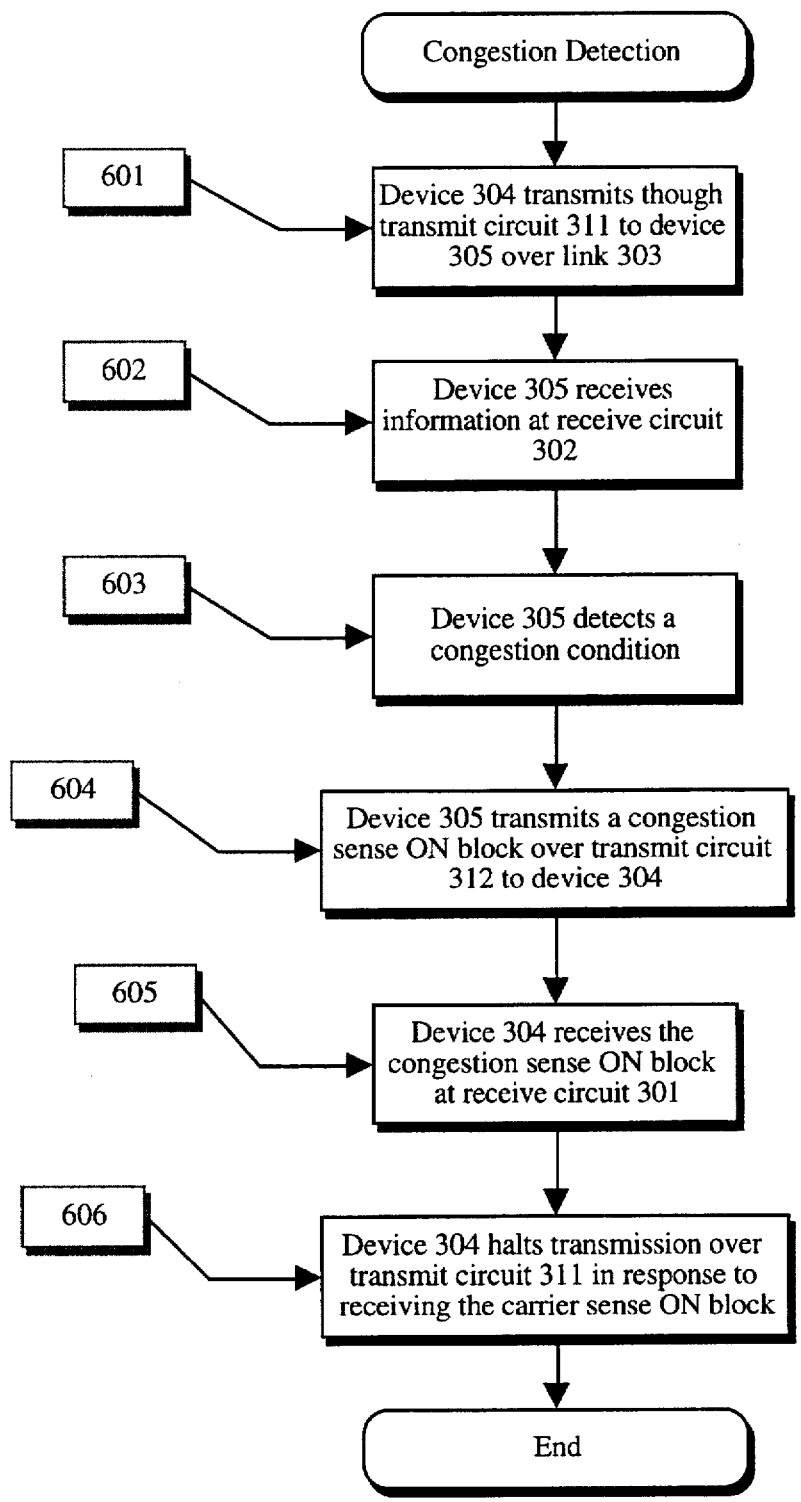
FIG. 6 is a flow diagram illustrating a congestion detection method as may be practiced by the present invention.

FIG. 6 is useful for illustrating the method of detecting a congestion condition and for halting transmission of data to a device as practiced in the present invention. The method of detecting congestion conditions and halting transmission of data is described with reference to device 304 transmitting information to device 305. Of course, this discussion applies equally to situations where device 305 transmits information to device 304.

Initially, device 304 transmits data through transmit circuit 311 to device 305 over link 303, block 601. The information may comprise one or more packets of the format described in connection with FIG. 4. Device 305 receives the information at receive circuit 302, block 602. Device 305 may, at some point, determine that a congestion condition has occurred, block 603—for example, device 305 may determine that receive data buffers are full. Responsive to determining that the congestion condition has occurred, receive circuit 302 notifies transmit circuit 312 of the congestion condition and transmit circuit 312 transmits a C/C sense ON signal over link 303 to device 304, block 604. As has been noted, transmit circuit 312 may transmit the C/C sense ON signal in-band with transmission of other information, for example, with packet data.

Device 304 receives the congestion sense ON signal at receive circuit 301 and directs the signal to control circuit 306, block 605. As has been discussed, control circuit 306 operates, responsive to receipt of the C/C sense ON block, to halt transmission of data over transmit circuit 311, block 606. Transmit circuit 301 will continue to transmit idle signals, and when required management and control signals, in order to provide continuous receive clock synchronization at device 305.

It might be noted here that receive circuit 302 may be configured to sense arrival of data on link 303 during periods when a congestion condition exists and, when data is so detected, to communicate this to transmit circuit 312 in order to effect transmission of another C/C sense ON signal to device 304. Providing this additional capability in receive circuit 302 allows for control 306 to be periodically refreshed as has been discussed above.

Method of Providing for Relief of Signaled Congestion Conditions

Figure 7:
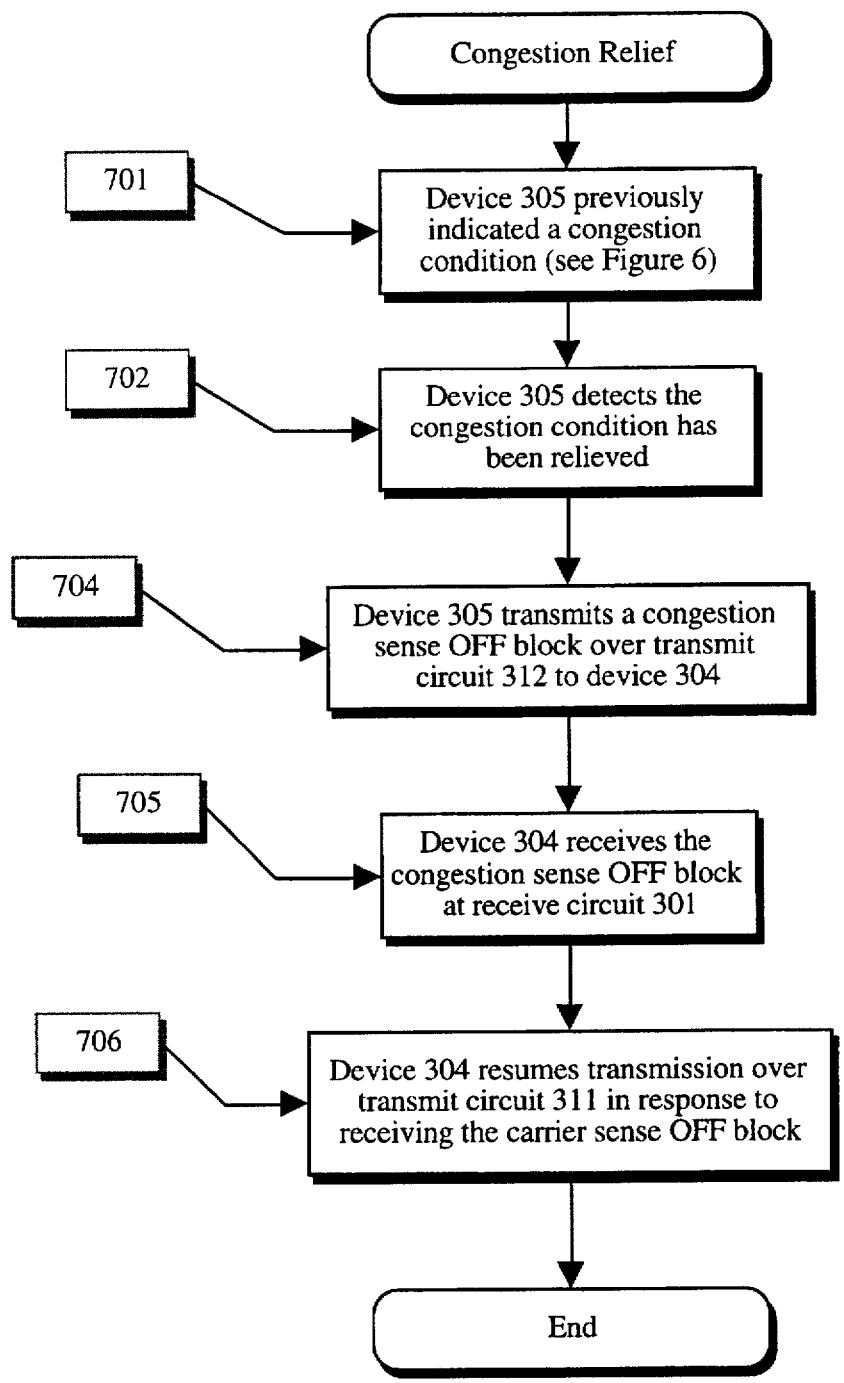
FIG. 7 is a flow diagram illustrating a congestion relief method as may be practiced by the present invention.

After having notified device 304 of the existence of a congestion condition, at some point, device 305 will have relieved the congestion condition—for example by clearing the receive data buffers. FIG. 7 is useful for describing a method employed by the present invention for resuming communication of data after a congestion condition has been relieved.

As has been discussed in connection with FIG. 6, initially, a congestion condition is sensed by device 305 and device 304 is caused to halt transmission of data over link 303, block 701. Device 305 then detects that the congestion condition has been relieved, again, for example by data buffers being cleared, block 702. Receive circuit 302 communicates to transmit circuit 312 that the congestion condition has been cleared and transmit circuit 312 then transmits a C/C sense OFF signal to device 304, block 704. Device 304 receives the C/C sense OFF signal at receive circuit 301, block 705, and provides the signal to control circuit 306. Responsive to receiving the C/C sense OFF signal, control circuit 306 controls transmit circuit 311 to allow resumption of transmission of data over link 303, block 706.

In-band Transmission of Congestion Signaling

Figure 8:
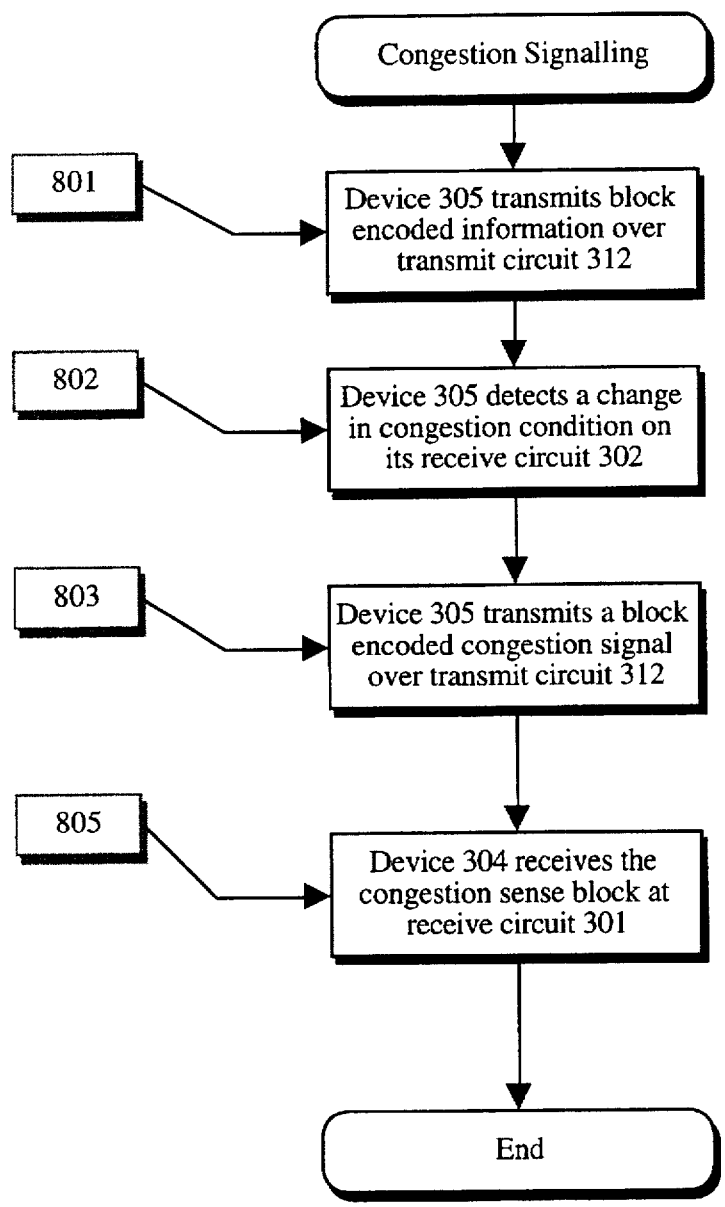
FIG. 8 is a flow diagram illustrating a congestion signaling method as may be practiced by the present invention.

As has been discussed, the present invention provides for in-band signaling of congestion conditions. A method utilized by the present invention for providing for such in-band signaling is illustrated in greater detail with reference to FIG. 8. FIG. 8 provides specific reference to transmission of congestion signals by device 305; however, the disclosed method is equally applicable to device 304.

Device 305 initially transmits block encoded information over transmit circuit 312. As discussed in connection with FIG. 5, this data may be block encoded idle signals, packet data, congestion and other control signals, and/or management information. At some point, device 305 detects a change in the congestion condition on its receive circuit 302, block 802. This change may be from an uncongested condition to a congested condition as was discussed in connection with FIG. 6 or from a congested condition to an uncongested condition as was discussed in connection with FIG. 7. In either event, responsive to detecting the change in congestion condition, device 305 transmits a congestion signal over transmit circuit 312. If the change in congestion condition was from uncongested to congested, a C/C sense ON signal is transmitted. If the change in congestion condition was from congested to uncongested, a C/C sense OFF signal is transmitted.

Importantly, in either case, as was discussed in connection with FIG. 4, the present invention discloses transmission of the congestion condition signal in a block encoded form in-band with other transmissions over link 303. For example, the congestion condition signal may be transmitted during transmission of packet data.

Device 304 receives the block-encoded congestion condition signal and provides the signal to control circuit 306 which acts to control transmit circuit 311 as has been described. Importantly, the present invention may be implemented with minor changes to the CSMA/CD MAC sublayer and without changes to higher level ISO hardware and software. Device 304 can continue to receive data over link 332 undisturbed by transmission of the congestion condition signal and higher level OSI layers may operate without change to their interfaces with the MAC sublayer.

Thus, what has been disclosed is a method and apparatus providing for a congestion sense controlled access network communication.

What is claimed is:

1. A method of transmitting information on a carrier sense network comprising:

(a) transmitting block encoded idle signals from a first device to a second device over a first communication channel during a first period when said first device does not have other information for transmission to said second device;

(b) said first device preparing other information for transmittal on said network;

(c) said first device transmitting said other information on said network during a second period, said other information starting with a block encoded start of frame delimiter; and (d) said first device receiving frames and idle signals during said first period and said second period on a second communication channel, said first device sensing a congestion condition as a result of receiving information on said second communication channel.

2. The method as recited by claim 1 wherein said other information further comprises destination address information, source address information, length information, user dam, and frame checking information.

3. The method as recited by claim 1 wherein said congestion condition is sensed during said second period and said first device transmits a block encoded congestion sense signal during said second period responsive to sensing said congestion condition.

* * * * *